Nov. 26, 1957   H. W. KLEIST   2,814,186
TRUCK PLATES
Filed Dec. 28, 1955   5 Sheets-Sheet 1

Inventor
Herman W. Kleist
by Parker & Carter
Attorneys

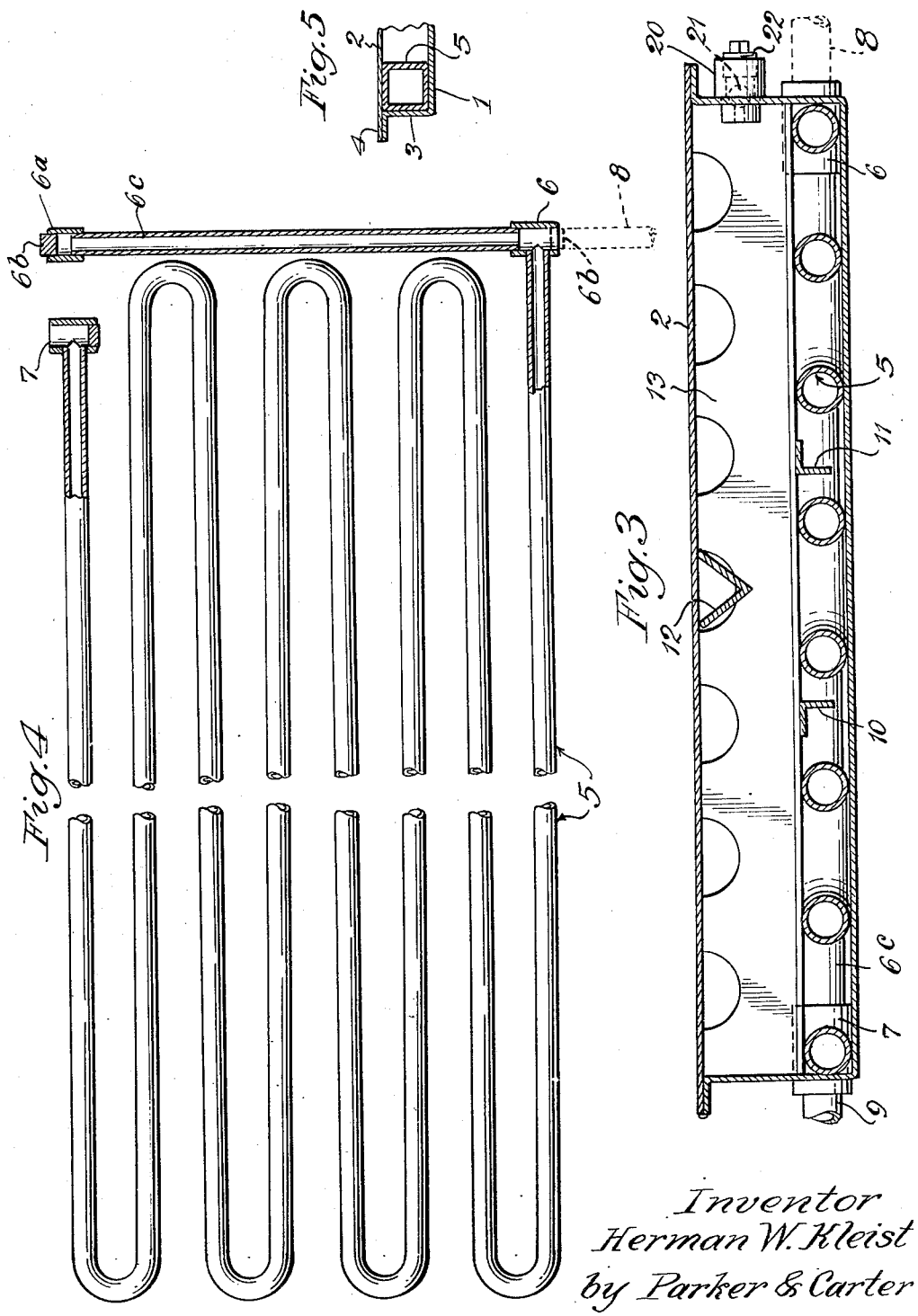

Nov. 26, 1957

H. W. KLEIST 2,814,186

TRUCK PLATES

Filed Dec. 28, 1955

Inventor
Herman W. Kleist
by Parker & Carter
Attorneys

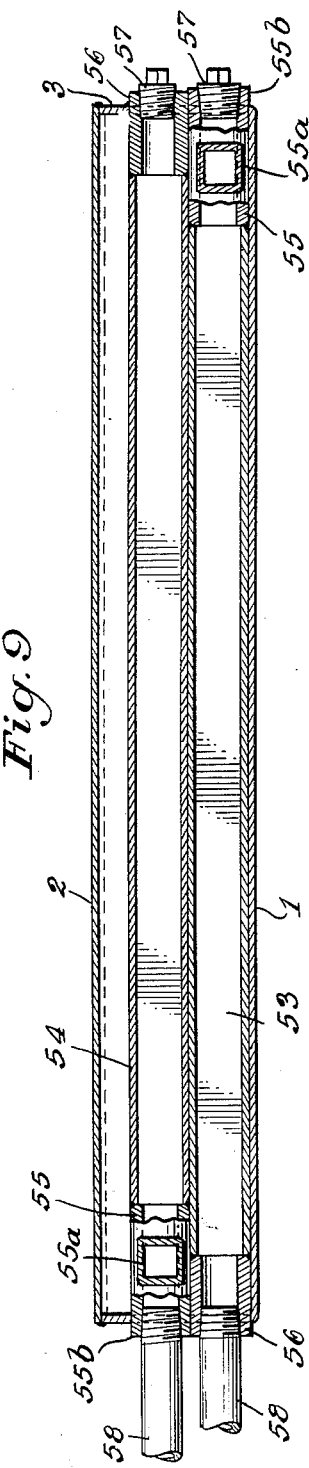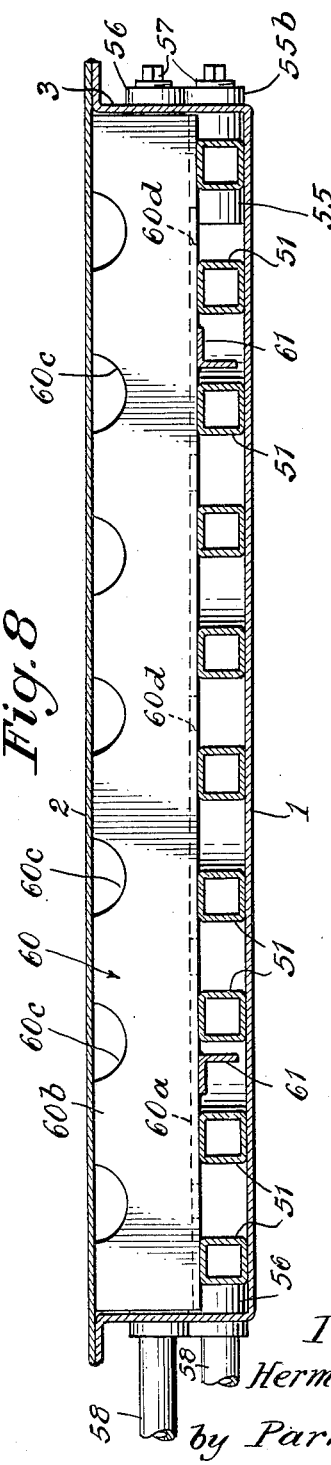

Nov. 26, 1957   H. W. KLEIST   2,814,186
TRUCK PLATES
Filed Dec. 28, 1955   5 Sheets-Sheet 5
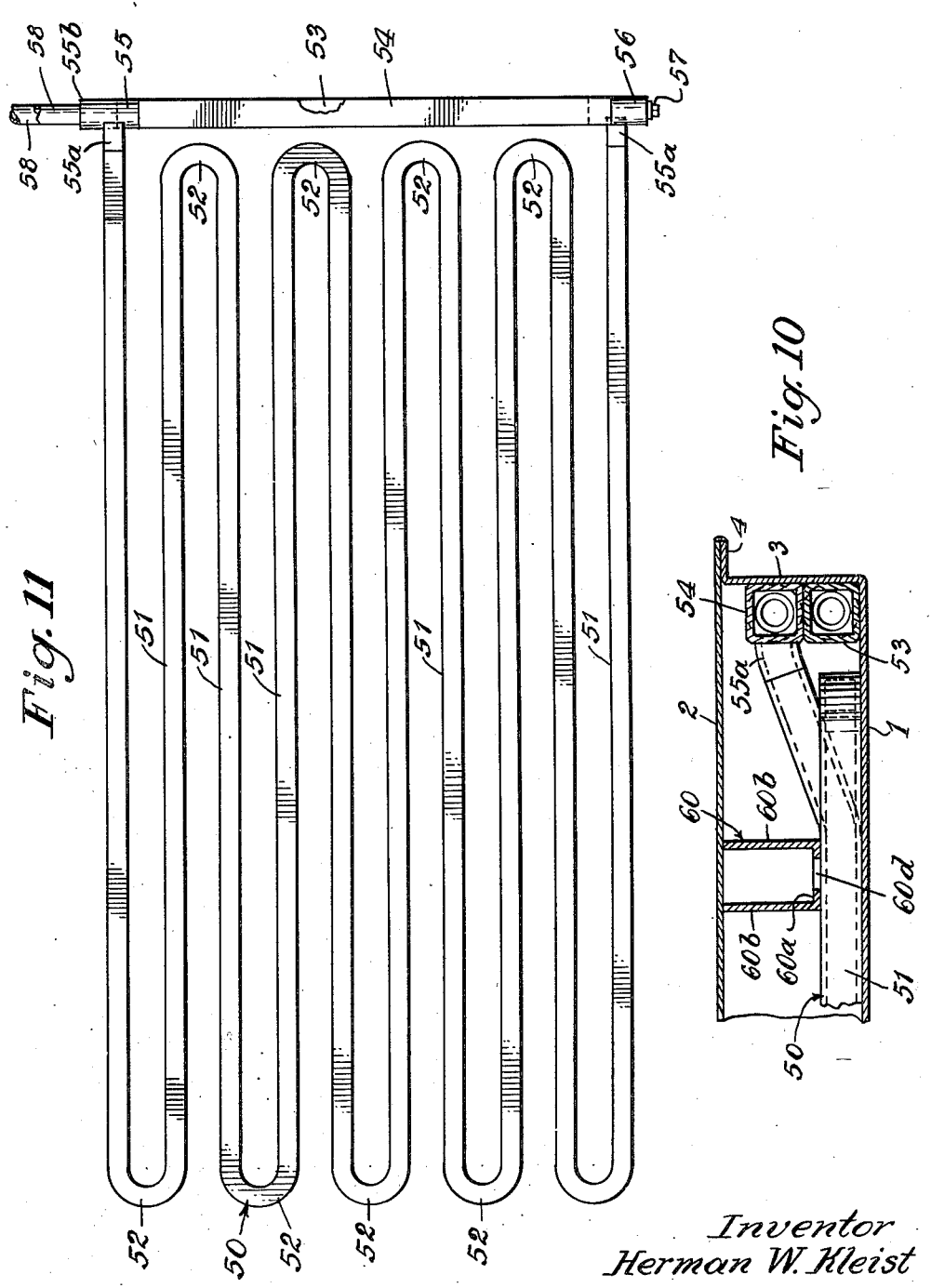
Inventor
Herman W. Kleist
by Parker & Carter
Attorneys United States Patent Office 2,814,186
Patented Nov. 26, 1957

2,814,186

TRUCK PLATES

Herman W. Kleist, Hollywood, Ill., assignor to Dole Refrigerating Company, Chicago, Ill., a corporation of Illinois Application December 28, 1955, Serial No. 555,898

15 Claims. (Cl. 62—126)

This invention relates to an improvement in cold plates used in refrigeration and has for one purpose to provide an improved evaporator in plate form, for use in refrigerating units of various kinds.

Another purpose is to provide such a plate or evaporator in which an improved heat exchange relation is maintained between an outer housing and a coil within the housing.

Another purpose is to provide an evaporator of the plate type, adapted for use in refrigerating cars or trucks and known in the trade as a truck plate.

Another purpose is to provide a coil structure for such a plate, which is adapted for the ready positioning of the plate in either vertical or horizontal position without the necessity of providing extra piping for connecting the plate.

Another purpose is to provide a cold plate and coil connections therefor which permits the connection of the plate to a system of ducts in which the coil of the plate may be connected to outside ducts by a pair of connections at either side of one end of the plate or by connections, one of which is at one side or edge of the plate and the other at the other such side or edge.

Another purpose is to provide a truck plate, with a coil and a body of eutectic in it, which may be located either in a horizontal or in a vertical position in a truck, and which provides a maximum variation of the possible points of connection between the coil within the truck and the ducts necessary to circulate or cycle a refrigerant through such coil.

Another purpose is to provide improved spacing means for use in positioning evaporator coils in truck plates and the like.

Other purposes will appear from time to time in the course of the specification and claims.

The present application is a continuation-in-part of my copending application Serial No. 373,569, filed in the United States Patent Office on August 11, 1953, for "Truck Plates," now abandoned.

I illustrate the invention more or less diagrammatically in the accompanying drawings, wherein:

Figure 3 is a section, on an enlarged scale, on the line 3—3 of Figure 2;

Figure 4 is a plan view of the coil with parts broken away and parts in section;

Figure 5 is a detail showing a variant coil;

Figure 8 is a section, on an enlarged scale, on the line 8—8 of Figure 7;

Figure 9 is a section, on an enlarged scale, on the line 9—9 of Figure 7;

Figure 10 is a section, on an enlarged scale, on the line 10—10 of Figure 6; and Figure 11 is a layout of the coil and connections of the plate shown in Figures 6 to 8, inclusive.

Like parts are indicated by like symbols throughout the specification and drawings.

Figure 1:
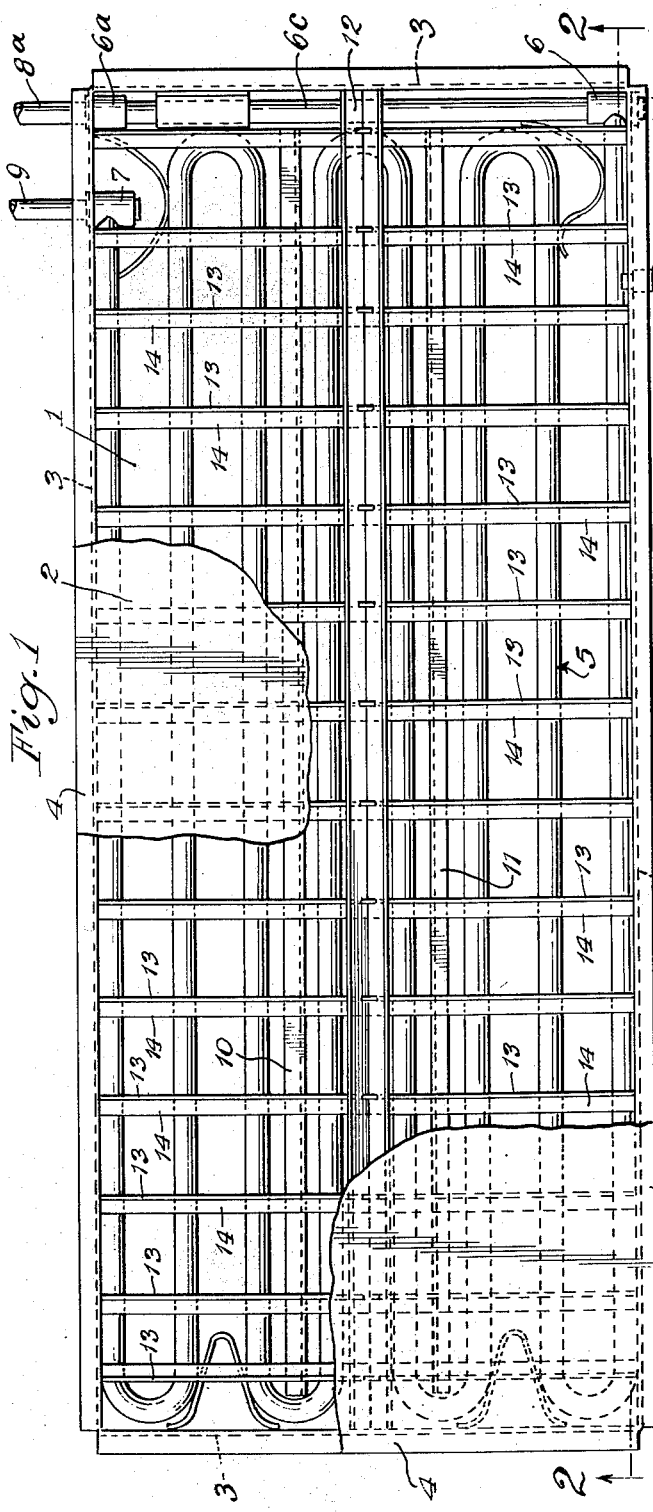
Figure 1 is a plan view with parts broken away.

Referring to the drawings, and considering, first, the form of Figures 1 to 4, inclusive, 1 indicates a side sheet or plate side wall and 2 indicates a parallel side sheet or plate side wall, spaced away from the wall 1 by flanges 3 which constitute a peripheral or circumferential connecting wall between the side walls 1 and 2. 4 indicates overlapping engaging wall portions which surround the plate. It will be understood that the above described plate structure is welded or otherwise connected to form a gas-tight container. As will be clear from Figures 1 and 2, the space with the plate or housing thus formed may be rectangular, with the circumferential wall 3 generally perpendicular to the plate side walls 1 and 2. Within the housing thus formed I position a coil generally indicated at 5.

In Figures 1 to 4, inclusive, I illustrate the coil 5 as circular in cross-section. In Figure 5, I illustrate a detail showing the edge of a plate in which the coil 5a is shown as rectangular in cross-section. It will be understood that, in most cases, it is immaterial whether I employ the circular coil 5 or the rectangular coil 5a, and I have indicated a circular coil in Figures 1 to 4 as a matter of convenience rather than as a matter of limitation. As will later appear, the form of Figures 6 and following is indicated with a coil which is rectangular in cross-section, but a coil which is circular in cross-section may, if desired, be also employed.

Considering, first, the layout of the coil, I show, in Figures 1 and 4, an inlet fitting 6 and an outlet fitting 7, the two fittings being connected by the coil 5 which is shown as arranged in a series of parallel rectangular lengths. As will be clear from Figure 4, a supply pipe 8, shown in dotted line, may be employed to deliver a volatile refrigerant to the inlet fitting 6. This volatile refrigerant will, when permitted by the cycling of appropriate refrigerating means, flow through the coil 5 to the outlet fitting 7 and escape by or be delivered to the outlet pipe or return duct 9. I illustrate, also, a supplemental inlet fitting 6a shown as connected to the fitting 6 by the pipe 6c. When the supply pipe 8 is connected to the inlet duct 6 the inlet duct 6a is out of use and may be closed by any suitable plug 6b. However, if the user wishes to have the inlet and the outlet fittings located adjacent to each other and at the same corner of the plate he has merely to remove the plug 6b from the supplemental fitting 6a and apply a similar plug 6b to the fitting 6. In that event a supply or delivery pipe 8a, shown in full line in Figure 1, is connected to the now open inlet fitting 6a. When the plate is in vertical position it may be convenient or advantageous to employ the inlet fitting 6. If it is in horizontal position it may be advantageous, instead, to employ the inlet fitting 6a. All that is necessary is to employ a closure plug for the inlet fitting which is out of use while connecting a supply pipe to the inlet fitting it is desired to use. It will be understood, of course, that the coil arrangement herein shown, although it is advantageous in connection with truck plates, may be employed with plates in which the internal height of the plate structure does not exceed the external diameter of the coil members and in which both plate side walls abut the surfaces of the coil. In general, when the coil abuts both plate side walls it is advantageous to employ the rectangular coil form shown at 5a in Figure 5.

Figure 2:
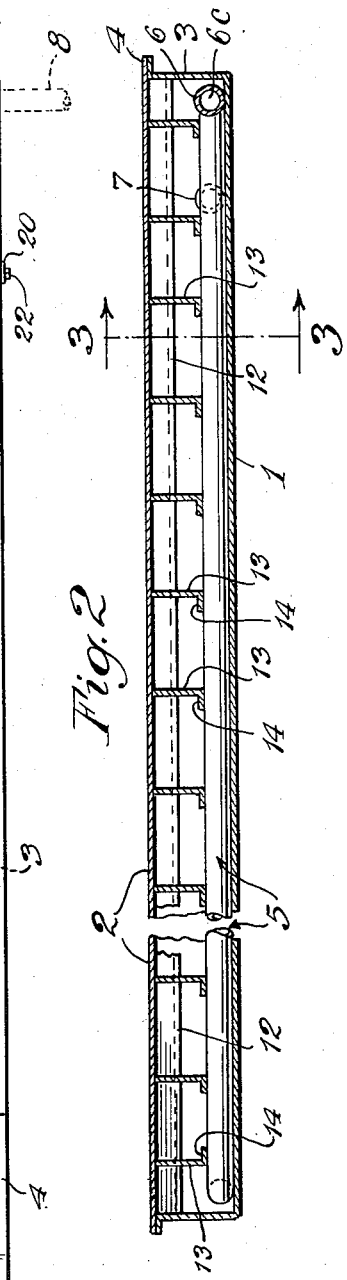
Figure 2 is a section on the line 2—2 of Figure 1.

In the truck plate structure as shown in Figures 1 to 3, inclusive, the side plate elements or walls 1 and 2 are spaced apart by a distance substantially exceeding the outside diameter of the coil element 5. I, therefore, provide a spacing and centering and heat transfer structure shown as including longitudinal structural or tying elements 10, 11 and 12, which connect and space transverse spacing and heat transfer ribs 13. The ribs 13 are flanged as at 14. The flanges 14 abut the elements of the coil 5 and hold the coil in firm contact with the inner surface of the side plate element 1. The opposite edges of the ribs 13 abut the inner surface of the side plate elements 2. The parts are normally held in firm contact by a pressure differential which is obtained by partially exhausting air from the interior of the plate housing through any suitable fitting 20. The fitting is shown as having a locking ball 21 and a screw-threaded closure plug 22. If the plug 22 is removed, any suitable suction means can be employed to draw air from the interior of the plate. The ball 21 will not interfere with the suction operation. When the suction operation ceases the excess pressure of the atmosphere forces the ball 21 into locking position, where it may be suitably sealed, the closure being completed by screwing the plug 22 to the closed position. The parts are so proportioned, as will be clear from Figure 3, that the flanges 14 of the ribs 13 engage the coil 5, while the longitudinal angle irons 10, 11 are still out of engagement with the inner surface of the plate side wall or element 1. Thus I insure a satisfactory heat exchange relation between the coil 5 and the wall 1, between the ribs 13 and the coil 5, and between the ribs 13 and the plate side wall 2. For ease in assembly and manufacture I find it advantageous to reassemble the spacing structure for a given plate. Such structure includes the elements 10, 11 and 12 and the associated ribs 13. In assembling the plate the coil may be dropped into the bottom of the housing formed by the side plate wall 1 and the circumferential wall 3, and the spacing structure is then dropped in position upon the coil and the plate side wall 2 is thereafter welded or otherwise secured in place. When air is thereafter withdrawn through the fitting 20 atmospheric pressure firmly holds the parts in the position in which they are shown in Figures 2 and 3, and with the above mentioned heat transfer relationship.

Figure 6:
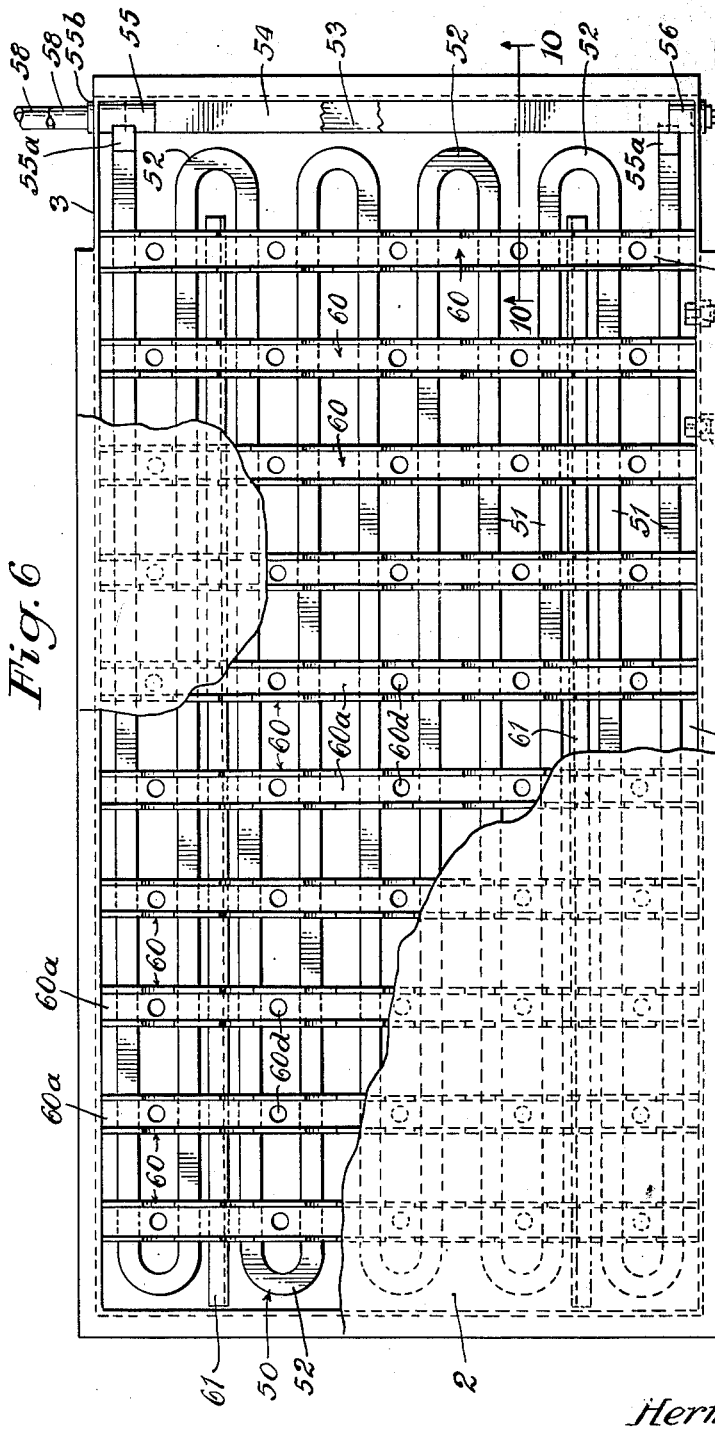
Figure 6 is a plan view of a variant type, with parts broken away and parts in dotted lines.

Referring now to the form of Figure 6 and following, I illustrate a plate and coil arrangement in which the coil within the plate has a maximum flexibility of connection to an outside system of ducts. Both ends of the coil may be secured at one side or corner of the plate, or at an opposite side or corner of the plate; or the circulation may include connections at opposite sides of the plate.

Considering Figure 6 and following in detail, the structure shown is generally similar to that of Figures 1 to 4, inclusive, but the coil is indicated as rectangular in cross-section, as in Figure 5. Since the plate is basically the same, I will describe, primarily, the coil and the system of ducts.

Figure 7:
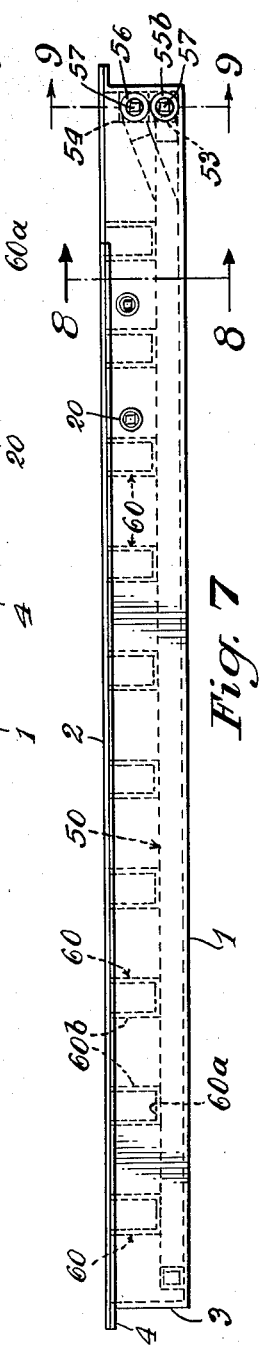
Figure 7 is a side elevation of the structure shown in Figure 6.

The coil, generally indicated as 50, includes a plurality of longitudinal, generally rectilinear lengths 51, connected at their ends by bends 52. At one end of the plate I illustrate a pair of transverse, rectangular ducts 53 and 54. Since the duct 54 overlies the duct 53 it is shown at a different level than the rest of the coil. This is clear, for example, in Figures 7 and 9. Preferably, plane surfaces of the ducts 53 and 54 abut the plane inner surface of the circumferential or edge wall 3. This provides good thermal contact and leaves no space for the eutectic to freeze between the ducts and said wall. It will be understood that each duct 53 or 54 has fittings at each end. As a matter of convenience, as shown in Figure 9, one such fitting 55 has a side entry or branch 55a for connection to the coil 50, and an end entry or branch 55b, which opens outwardly of one of the peripheral side walls 3 of the plate. Such a fitting 55 is shown as located at the lower end of the duct 53 and at the upper end of the duct 54, referring to the position of the ducts as shown in Figure 9. At the opposite end of each such duct is a simple fitting 56. It will be understood that the branches 55b of the ducts 55, and also the simple fittings 56, may alternatively receive a suitable closure 57 or a duct or tube connection 58. Thus, in connecting the coil 50 with a system for cycling, or circulating a refrigerant, there is a wide latitude of choice as to how the parts are connected up.

It will be noted that, in place of the spacing angles 13, 14 of Figure 2, I employ channels or U-shaped cross-pieces 60 which may be suitably connected by longitudinally extending connectors 61. These longitudinal connectors are so shaped or proportioned as not to interfere with the cross extension of the duct 54. This is clear from Figure 6.

In truck plates it is customary partially to fill the interior of the plate with a suitable eutectic. This eutectic may be introduced through the fitting 20 or through any other suitable filling aperture not herein shown. I do not wish to be limited to any specific volume or relationship of eutectic, but I find it convenient to fill in the neighborhood of ninety percent of the available spaces with the eutectic, thereafter withdrawing part of the air which remains.

It will be realized that, whereas, I have described and shown a practical and operative device, nevertheless many changes may be made in the size, shape, number and disposition of parts without departing from the spirit of my invention. I therefore wish my description and drawings to be taken as in a broad sense diagrammatic or illustrative, rather than as limiting me to my precise showing.

The use and operation of my invention are as follows:

In the coil structure herein shown I provide a convenient arrangement for permitting the connection of plates in a refrigerating assembly, with a minimum of piping, regardless of whether the plates are positioned on end or on their long side. When the plates are positioned on end and, for example, when a plurality of plates are connected in series, it is advantageous to have the inlet connection of one plate adjacent the outlet connection of a neighboring plate. In such a case the fittings 6a would be closed and the fittings 6 would be employed. However, when the plates are arranged on their long sides it is generally more convenient to close the fitting 6 and to employ the supplemental fitting 6a.

Whereas I have shown my invention, in Figures 1 to 3, as applied to a truck plate, in which a spacing structure is used, it will be understood that I may employ my invention in connection with thin plates in which no spacing means are employed, and in which both side walls of the plate engage the coil. It is preferable to use a rectangular tube, as shown in Figure 5. In the form of Figures 6 and following I illustrate a truck plate in which rectangular tubing is employed. The rectangular tubing is positioned in the plate to abut one of the side plate walls 1 and 2, and, also, if desired, the circumferential or peripheral wall 3.

Whereas the form of Figures 1 to 5, inclusive, is sufficiently flexible to permit the plate to be coupled into a system of ducting, with the plate either on one edge or on one end, the form of Figures 6 and following is somewhat more flexible. In that form, with two cross-ducts employed, and with each of such cross-ducts adapted to accept the alternative of a closure or a tube at either end, there is complete flexibility in positioning and arranging the plates.

The spacing and heat transfer structure herein shown is convenient and efficient, and lends itself to the rapid assembly and economical manufacture of plates. The spacing and heat transfer structure located between the coil and one of the plate side walls constitutes a unit which can be bodily applied to or removed from the plate.

In all forms of the device the spacing elements include fins or channels having edges positioned to contact the coil along one edge and one of the plate side walls along the other. The fins or channels are connected by the earlier described longitudinal members.

In the form of Figures 6 to 9, inclusive, the rectangular tubing provides a maximum heat transfer relation with one of the plate side walls. The spacing channels 60, which are U-shaped, have a maximum heat transfer contact with the rectangular tubes, as is clear, for example, in Figure 7. Each such channel contacts the tubing system with its cross-piece 60a, and has two heat transmitting flanges or fins 60b which are in communication with the eutectic, and which engage, with their opposite edges, the opposite plate side wall. The fins or flanges 60b are cut away along their edges, as at 60c, to provide room for the passage of the eutectic when the eutectic is in liquid condition. Similarly, the portions 60a are provided with apertures 60d for the same purpose. It will be noted, also, as at the right hand of Figures 6 and 7, that the cross ducts 53 and 54, which are rectangular in cross-section, abut the end or edge wall 3 with a maximum heat conductive connection. Also, having the two cross ducts adjacent and contacting each other, and contacting the end wall, there is no risk of eutectic freezing between the ducts or between the ducts and the end wall, with any tendency to move the fittings or put any strain upon their connection to the edge walls.

In connection with the employment of square tubing, it will be understood that the square tubing provides, for a given diameter, a greater internal cross-sectional area, with less resistance to the flow of the refrigerant. The bends 52 are sufficiently large in radius to provide a minimum resistance to free flow. The employment of rectangular tubing maintains a better thermal contact between the tubing and the plate side walls and between the tubing and the spacing members 60. If desired, the outer tubing lengths, shown in Figure 6, may also abut the inner surfaces of the edge walls 3, for improvement in thermal contact, and to prevent freezing of the eutectic between the tubing and the inner surfaces of the edge walls.

I claim:

1. In a cold plate evaporator structure for refrigeration, a plate body which includes two plate side walls connected together about their edges in gas-tight relationship, a coil within said body, an outlet fitting for said coil, an inlet fitting for said coil, and an alternative fitting for said coil, connected to one of said fittings by a tubular passage extending transversely across one end of the plate, within the plate, and from side to side thereof, and means for selectively closing the alternative fitting or the fitting to which it is connected.

2. In a truck plate for refrigerating cars, trucks and the like, a plate body which includes parallel spaced plate side walls and peripheral side and end walls connected in gas-tight relationship, spacing means within the body thus formed, a coil within said body between said spacing means and one of said plate side walls, said coil being in direct heat exchange contact with said plate side wall, a transverse duct adjacent one end of the plate and extending from one peripheral side wall to the other, said coil being connected to said duct, the opposite ends of said duct being adapted alternatively to receive a tubular connection or a closure, and a tubular connection for the opposite end of the coil located in one of said peripheral side walls adjacent an end of said duct, the interior of the plate body exteriorly of the coil being partially filled with an eutectic, and means for maintaining a less-than-atmospheric pressure within the plate, whereby exterior atmospheric pressure is made effective to urge the plate side walls together against the spacing means and the coil.

3. The structure of claim 2, characterized in that the coil is rectangular in cross-section.

4. In a truck plate for refrigerating cars, trucks and the like, a plate body which includes parallel spaced plate side walls and peripheral side and end walls connected in gas-tight relationship, spacing means within the body thus formed, a coil within said body between said spacing means and one of said plate side walls, said coil being in direct heat exchange contact with said plate side wall, two generally parallel transverse ducts adjacent one end of the plate and extending from one peripheral side wall to the other, one end of said coil being connected to one said duct, the other end of the coil being connected to the other said duct, the opposite ends of said ducts being adapted alternatively to receive a tubular connection or a closure, the interior of the plate body exteriorly of the coil being partially filled with an eutectic, and means for maintaining a less-than-atmospheric pressure within the plate, whereby exterior atmospheric pressure is made effective to urge the plate side walls together against the spacing means and the coil.

5. The structure of claim 4, characterized in that the coil is rectangular in cross-section.

6. In a cold plate evaporator structure for refrigeration, a plate body which includes plate side walls connected together about their edges in gas-tight relationship, a coil within said body, and means for connecting both ends of said coil with an exterior duct system which include alternatively usable fittings at opposite sides of the plate body, said fittings being located at opposite sides of the plate, and a transverse conduit, within the plate, connecting said fittings.

7. In a cold plate evaporator structure for refrigeration, a plate body which includes plate side walls connected together about their edges in gas-tight relationship, a coil within said body having generally parallel lengths extending generally from end to end of the plate, the individual parallel lengths being connected by bends, and means for connecting both ends of said coil with an exterior duct system, such means including a pair of transverse ducts adjacent one end of the plate, one of said ducts being in communication with one end of the coil, the other of said ducts being in communication with the opposite end of said coil, each of said ducts having an opposite end at each side of the plate adapted alternatively to receive a closure or a connecting duct.

8. The structure of claim 7, characterized in that the coil is rectangular in cross-section.

9. In a truck plate for refrigerating cars, trucks and the like, a plate body which includes parallel spaced plate side walls and peripheral side and end walls connected in gas-tight relationship, spacing means within the body thus formed, a coil within said body between said spacing means and one of said plate side walls, said coil being in direct heat exchange contact with said plate side wall, a plurality of generally parallel transverse ducts adjacent one end of the plate and extending from one peripheral side wall to the other, one end of said coil being connected to one said duct, the other end of the coil being connected to the other said duct, the opposite ends of said ducts being adapted alternatively to receive a tubular connection of a closure, the interior of the plate body exteriorly of the coil being partially filled with an eutectic, the coil including parallel rectilinear lengths extending longitudinally substantially from end to end of the plate, said longitudinal lengths being connected by bends, at least one of said ducts extending across the end portion of said coil, and means for maintaining a less-than-atmospheric pressure within the plate, whereby exterior atmospheric pressure is made effective to urge the plate side walls together against the spacing means and the coil.

10. In a cold plate evaporator structure for refrigeration, a plate body which includes two plate side walls connected about their edges in gas-tight relationship, a rectangular coil within said body, in contact with one of said plate side walls, inlet and outlet fittings for said coil, and a spacing and heat transfer structure between said coil and the other plate side wall, including a plurality of fins having edges positioned and proportioned for contact with said coil along one edge of the fins and with said opposite plate side wall along the other edge of the fins, said coil being rectangular in cross-section and having one plane face in contact with the inner surface of one of said plate side walls and another plane face in contact with the spacing and heat transfer structure.

11. In a cold plate evaporator structure for refrigeration, a plate body which includes two plate side walls connected about their edges in gas-tight relationship, a rectangular coil within said body, in contact with one of said plate side walls, inlet and outlet fittings for said coil, and a spacing and heat transfer structure between said coil and the other plate side wall, including a plurality of fins having edges positioned and proportioned for contact with said coil along one edge of the fins and with said opposite plate side wall along the other edge of the fins, and one or more connecting members for said fins whereby the spacing structure may be unitarily positioned in the plate body during the manufacture of the evaporator.

12. In a cold plate evaporator structure for refrigeration, a plate body which includes two plate side walls connected about their edges in gas-tight relationship, said connection including rectilinear edge and end walls perpendicular to the plate side walls, a rectangular coil within said body having plane face portions in contact with one of said plate side walls and other plane face portions in contact with said rectilinear walls, the interior of said plate, outside of said coil, being at least partially filled with an eutectic, and a spacing and heat transfer structure between said coil and the other plate side wall, including a plurality of channels having plane portions positioned and proportioned for contact with a plane face of said coil, and having fins, the edges of which are in contact with the opposite plate side wall, and one or more connecting members for said channels whereby the spacing structure may be unitarily positioned in the plate body during the manufacture of the evaporator, said plane channel portions and fins being apertured to permit the passage of eutectic therethrough.

13. The structure of claim 12, characterized by and including a pair of transverse rectangular ducts located at one end only of the plate body, a plane surface of said ducts being in contact with the rectilinear end wall at one end of the plate body, each said transverse duct having its interior connected to one end of the coil, each said transverse duct being secured at each end to an opposite rectilinear edge wall and having an exteriorly accessible aperture adapted to receive, selectively, a closure or a duct connection.

14. In a truck plate for refrigerating cars, trucks and the like, a plate body which includes parallel spaced plate side walls and peripheral side and end walls connected in gas tight relationship, spacing means within the body thus formed, a coil within said body between said spacing means and one of the plate side walls, said coil being in direct heat exchange contact with said plate side wall, the interior of the plate body exteriorly of the coil being partially and substantially filled with a eutectic, said coil, within said plate, having at least three exterior connections, mounted on the plate and to which said coil is connected, said connections being adapted to receive, at choice, closures or exterior tubular connections, whereby said coil may at choice be connected to exterior tubular connections at different points about the edge of the plate.

15. The structure of claim 14 characterized in that the coil within the body is formed of rectangular tubing.

References Cited in the file of this patent

UNITED STATES PATENTS

| | | |
|---|---|---|
| 505,588 | Behn | Sept. 26, 1893 |
| 894,285 | Rassbach | July 28, 1908 |